STATES PATENT OFFICE 2,384,103

PROCESS FOR THE MANUFACTURE OF PENTOSES

John Lee, Essex Fells, Ulrich V. Solmssen, Clifton, and Leo Berger, Nutley, N. J., assignors to Hoffmann-La Roche, Inc., Nutley, N. J., a corporation of New Jersey No Drawing. Application September 30, 1943, Serial No. 504,443

8 Claims. (Cl. 260—209)

This invention relates to an improvement in the manufacture of pentoses, such as ribose, lyxose, xylose and arabinose, especially of pure pentoses from crude mixtures containing pentoses.

In the large scale production of ribose it was hitherto necessary to isolate the sugar from crude reaction mixtures containing it; for example, from reduction products of ribonolactone and from natural hydrolysates of nucleic acid, nucleotides and nucleosides. The procedure usually involves an extensive purification of the solutions and, in most cases, the subsequent isolation of the ribose by means of its derivatives with, for instance, the expensive bromophenylhydrazine or diphenylhydrazine. Moreover, bromophenylhydrazine is unstable and therefore unsuited for technical scale operations. The hydrazones obtained must be isolated and purified. These are then hydrolyzed in the presence of formaldehyde or benzaldehyde. The hydrazones of these aldehydes (as well as excess of the aldehydes themselves which must be employed) must then be removed. This latter operation often presents considerable difficulties, repeated extraction treatment being necessary. Such processes are also unsatisfactory from the point of view of yield and the ribose obtained by them is usually syrupy and requires considerable treatment to obtain a crystalline form. In the process described by Fischer and Piloty, Ber. 24, 4214 (1891) and further modified by Steiger, Helvetica Chimica Acta 19, 193 (1936), the complex nature of the above procedure is illustrated.

By our improvement, ribose can be isolated starting from a relatively impure crude material in a manner which, in sharp contrast to the state of the art, is rapid, simple and inexpensive to carry out.

In our copending application, Ser. No. 504,442, filed of even date herewith, we have described and claimed a new class of N-pentosides which are characterized by ease of formation, by condensation of a primary aromatic amine and the pentose in solution at room temperature at a pH of from about 2 to about 8, and especially by the fact that they crystallize directly in good yield and are easily separated from the solution, sometimes in the form of complexes with soluble alkali metal or ammonium salts. We point out in the copending application that this strong tendency to separate from solution is apparent even where the solutions of the sugar are relatively impure.

Kuhn and Birkofer in Ber. 71, 629 (1938) have described another class of N-pentosides which are formed in solution by condensation of a primary aromatic amine and a pentose with application of heat. We have stated in our copending application that in order to demonstrate the fact that the two N-pentosides represent different classes, we compared the compound formed by heating together ribose and 3,4-dimethylaniline in alcoholic solution, as described by Kuhn and Birkofer in Ber. 71, 629 (1938), with the compound resulting from the condensation of the components at room temperature according to our process. The former has the probable formula of a furanoside:

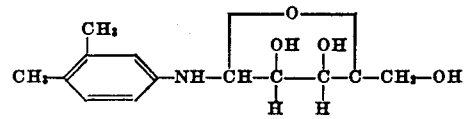

and the characteristics: $[\alpha]_D^{21} = +172°$ ($c = 0.5$ in pyridine), M. P. 128–130°, whereas the probable formula of our compound is that of a pyranoside:

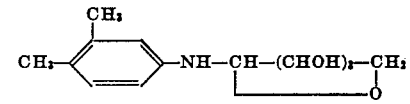

with the characteristics: $[\alpha]_D^{25°} = +94.5° \rightarrow +53.0°$ ($c = 1.0$ in pyridine), M. P. 110–112° C.

We have discovered that both classes of N-ribosides can be hydrolyzed to give excellent yields of pure ribose. Hydrolyzation can be effected by refluxing the N-pentoside in aqueous or aqueous alcoholic solution or suspension until the hydrolysis is complete, as can be determined if necessary by polarimetric observation. The preferred pH range for the hydrolysis is from about 2 to about 9, and the decomposition of the N-pentoside may be facilitated by binding the liberated amine to an aldehyde present during the reaction, such as benzaldehyde, substituted aromatic benzaldehydes, formaldehyde and the like. We may also advantageously add a small quantity of a volatile lower fatty acid, such as formic, acetic or propionic acid, or traces of strong acids, although the latter cause some decomposition of the ribose. The presence of a non-oxidizing atmosphere is advantageous. This can be accomplished by displacing the air with $CO_2$ or $N_2$.

Hydrolyzation and removal of the amine may be carried out by other means, as, for example, by steam distillation of an aqueous solution or suspension of the N-riboside; the liquors on evaporation yield ribose. In this case, the reaction is carried out in the presence of a weak base, as the primary amine liberated forms a slightly alkaline solution. By steam distillation we mean steam distillation under pressure or under vacuum; we also include steam distillation in an atmosphere of inert gas.

We have furthermore found that the complex compounds of N-ribosides and water-soluble salts of alkali metals or of ammonium, which are described in our aforementioned copending application Ser. No. 504,442, can be satisfactorily used in the above operations instead of pure N-ribosides. By complexes of the ribosides we mean the ribosides conforming to the above description with a greater or lesser proportion of salt of an alkali metal or ammonium salt, as, for example, sodium sulfate, sodium chloride, sodium nitrate, sodium citrate, sodium acetate, sodium phosphate, ammonium chloride and the like, and water or other solvent of crystallization. In this case, the aqueous solution after removal of the amine is evaporated to dryness and the ribose removed by extraction from the salt by a suitable solvent such as alcohol. Alternatively, the complex which contains sufficient water for the hydrolysis can be suspended in alcohol and the hydrolysis performed in the presence of benzaldehyde as described. The insoluble salt is then filtered off, water added, the alcohol removed and the benzal compound eliminated in the usual manner. We have found that the process is especially valuable since the complex salts can be obtained in very high yield.

The recovery of the aromatic amine from the condensation products after or even during hydrolysis provides for our process the additional advantage of convenience and reduction in cost of operation.

Suitable N-ribosides for use in our invention are aniline ribosides, alkoxyaniline ribosides, chloraniline ribosides, naphthylamine ribosides, hydroxyaniline ribosides, toluidine ribosides and xylidine ribosides, as, for example, aniline-N-d-ribofuranoside, aniline-N-d-ribopyranoside, o-chloraniline-N-d-ribopyranoside, anisidine-N-d-ribofuranoside, 3,4 - dimethylaniline-N-d-ribofuranoside, 3,4-dimethylaniline-N-d-ribopyranoside, o-hydroxyaniline-N-d-ribopyranoside, p-toluidine-N-d-ribopyranoside, α-naphthylamine-N-d-ribopyranoside and their 2,3,4-triacetyl derivatives, 2,3,4-tribenzoyl derivatives, 2,3,5-triacetyl derivatives and 2,3,5-tribenzoyl derivatives as, for example, α-triacetyl-aniline-N-d-ribofuranoside and α-triacetyl-aniline-N-d-ribopyranoside.

The invention is illustrated by the following examples without intending to limit the scope of the invention thereto.

*Example 1*

16 g. α-aniline-d-ribopyranoside-sodium sulfate complex, equivalent to 7.92 g. pure riboside, are dissolved in 200 cc. of water containing 0.25% acetic acid. The air is displaced from the apparatus by means of nitrogen and the solution is steam distilled under an atmosphere of nitrogen until all the aniline is removed. The residue remaining is stirred with 0.5 g. norite, filtered and evaporated to dryness in vacuum. The residue is extracted twice with warm absolute alcohol, filtered and evaporated to dryness. The syrup crystallizes immediately on seeding with a crystal of D-ribose. M. P. 84–6°.

$$[\alpha]_D^{26°\,C.} = -19.4°$$

By norite we mean the commercially available decolorizing carbon of that name, but any carbon with similar characteristics may be used.

*Example 2*

29 g. α-aniline-d-ribopyranoside-sodium sulfate complex, containing 70% of riboside, as determined by titration with Fehling's solution, is suspended in 90 cc. absolute alcohol, 17.5 cc. freshly distilled benzaldehyde is added. The mixture is refluxed for ½ hour, cooled and filtered from sodium sulfate. To the filtrate 45 cc. of water is added and the solution extracted with ether. The aqueous solution is then decolorized with a small amount of carbon, filtered and evaporated to dryness. On recrystallizing from 18 cc. of alcohol, a 71% yield of pure ribose is obtained.

*Example 3*

29 g. α-aniline-d-ribopyranoside-sodium sulfate complex, containing 70% riboside, is suspended in 90 cc. of water and 17.5 cc. fresh benzaldehyde added. The mixture is refluxed under an atmosphere of nitrogen gas for ½ hour and cooled. The benzalaniline is removed by extracting with ether, the aqueous residue decolorized with a little carbon, evaporated to dryness and recrystallized from alcohol. The yield is $$10.0 \text{ g.} = 73.5\%$$

*Example 4*

4.0 g. α-aniline-d-ribopyranoside is dissolved in 200 cc. of water containing 0.25% acetic acid. The solution is steam distilled under an atmosphere of carbon dioxide until all the aniline is removed and the solution is treated with 0.25 g. of norite, stirred and filtered. The clear solution, on evaporation to dryness, recrystallizes from 4 cc. absolute alcohol yielding 2.3 g. of pure crystalline ribose, 86.2%.

Ribose may also be prepared from α-aniline-d-ribopyranoside by hydrolysis in the presence of benzaldehye as described in Example 2.

*Example 5*

10 g. α-aniline-d-ribopyranoside (M. P. 125–7°; $[\alpha]_D^{24°\,C.} +63.4° \rightarrow +48.6°$) is dissolved in 80 cc. boiling absolute alcohol, refluxed for one hour and cooled. Crystallization occurs, and, after washing with cold absolute alcohol and ether, the yield is 9.9 g. of α-aniline-N-d-ribofuranoside. M. P. 138–40°. $[\alpha]_D^{27°} = +176.5° \rightarrow +156.6°$ ($c=3.0$ in pyridine).

4.0 g. α-aniline-d-ribofuranoside is dissolved in 200 cc. water containing 0.25% acetic acid and the solution steam distilled under an atmosphere of nitrogen. When all the aniline is removed the residual solution is decolorized with 0.25 g. of norite, filtered and evaporated to dryness under vacuo. The residue is taken up twice in absolute alcohol and evaporated to dryness. The resultant syrup is dissolved in 4 cc. absolute alcohol, from which 2.4 g. of ribose crystallizes immediately. M. P. 86–7°. $[\alpha]_D^{27°} = -19.6°$.

*Example 6*

45 g. α-aniline-N-d-ribofuranoside is suspended in 2250 cc. water in a 5-liter, 3-neck flask provided with a stirrer and condenser. The reaction mixture is heated until the glycoside dissolves, and at this point 35 cc. benzaldehyde are added. The mixture is refluxed under nitrogen for ½ hour, cooled overnight and benzalaniline filtered off. The aqueous residues are extracted with ether to remove final traces of benzalaniline, decolorized with norite and evaporated to a syrup. The syrup is then dried by taking up in alcohol and re-evaporated and dissolved in alcohol in the ratio of 5 g. syrup to 6.5 cc. alcohol. On seeding, ribose crystallizes out in 95% yield. M. P. 86–7°.

From the liquors of crystallization, α-aniline-N-d-ribofuranoside-sodium salt complex can be prepared according to our patent application Ser. No. 504,442, and this again re-worked for ribose.

In a similar manner to the above, α-3,4-dimethylaniline-N-d-ribofuranoside can be hydrolyzed to yield ribose.

While our above examples are limited to an illustration of the application of our hydrolyzation method to aromatic amine N-ribosides made from impure ribose, it is to be understood that the method is equally applicable to other N-pentosides, such as those from lyxose, xylose and arabinose. In our aforementioned copending application Ser. No. 504,442, we have described the α-aniline-N-d-arabinopyranoside as well as N-ribosides prepared from substantially pure sugars.

In the description and in the appended claims, by ribosides we mean the obviously equivalent α- and β-ribopyrano-sides or α- and β-ribofuranosides; we also mean that these ribosides may be in the $d$ or $l$ form.

What we claim is:

1. Process for the manufacture of a pentose from a primary aromatic amine N-pentoside which process comprises heating a primary aromatic amine N-pentoside in solution at a pH range of from about 2 to about 9 in the presence of water until hydrolysis is substantially complete, separating the primary aromatic amine set free and isolating the pentose from the aqueous solution by evaporation.

2. Process for the manufacture of a pentose from a primary aromatic amine N-pentoside which process comprises heating an aniline N-pentoside in solution at a pH range of from about 2 to about 9 in the presence of water until the hydrolysis is substantially complete, separating the amine set free and isolating the pentose from the aqueous solution by evaporation.

3. Process for the manufacture of a pentose from a primary aromatic amine N-pentoside which process comprises heating α-aniline-N-d-pentopyranoside in solution at a pH range of from about 2 to about 9 in the presence of water until the hydrolysis is substantially complete, removing the amine set free by means of benzaldehyde and isolating the pentose from aqueous solution by evaporation.

4. Process for the manufacture of ribose which comprises heating α-aniline-d-ribopyranoside-sodium sulfate complex in aqueous alcoholic solution in the presence of benzaldehyde until hydrolysis is substantially complete, cooling the solution, filtering from sodium sulfate, diluting the filtrate with water and extracting it with ether, and isolating the ribose from the remaining aqueous solution.

5. Process for the manufacture of ribose which comprises heating α-aniline-N-ribofuranoside in solution at a pH range of from about 2 to about 9 in the presence of water until the hydrolysis is substantially complete, removing the amine set free by steam distillation and isolating ribose from the aqueous solution by evaporation.

6. Process for the manufacture of ribose which comprises heating a 3,4-dimethylaniline-N-riboside in solution at a pH range of from about 2 to about 9 in the presence of water until the hydrolysis is substantially complete, separating the amine set free and isolating the ribose from the aqueous solution by evaporation.

7. Process for the manufacture of ribose which comprises heating α-3,4-dimethylaniline-N-d-ribofuranoside in aqueous solution at a pH range of from about 2 to about 9 until the hydrolysis is substantially complete, removing the amine set free by steam distillation and isolating ribose from the aqueous solution by evaporation.

8. Process for the manufacture of a pentose from a primary aromatic amine N-pentoside which process comprises heating the complex compound of a primary aromatic amine N-pentoside with a soluble salt selected from the group consisting of alkali metal salts and ammonium salts in solution in the presence of water at a pH range of from about 2 to about 9 until hydrolysis is substantially complete, separating the primary aromatic amine set free and isolating the pentose from the aqueous solution by evaporation.

JOHN LEE.
ULRICH V. SOLMSSEN.
LEO BERGER.